M. BRUNET & J. MAČEK.
SIGN.
APPLICATION FILED JULY 11, 1912.
1,074,350.
Patented Sept. 30, 1913.
7 SHEETS—SHEET 1.
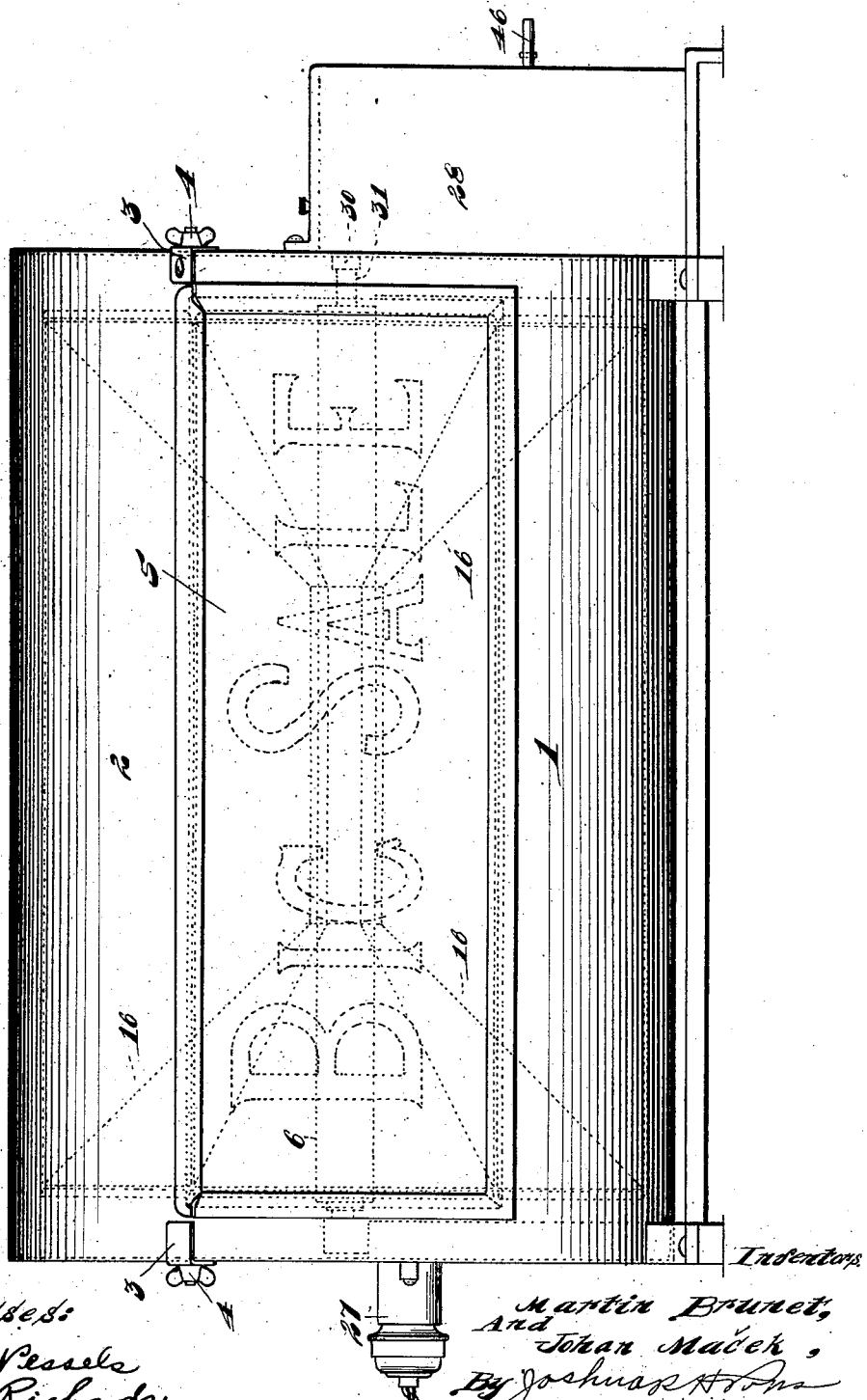

M. BRUNET & J. MACEK.
SIGN.
APPLICATION FILED JULY 11, 1912.

1,074,350.  Patented Sept. 30, 1913.

7 SHEETS—SHEET 2.

Witnesses:
C. E. Wessels
B. J. Richards

Inventors:
Martin Brunet,
And
Johan Macek,
By Joshua R. H. Potts
their Attorney.

M. BRUNET & J. MACEK.
SIGN.
APPLICATION FILED JULY 11, 1912.
1,074,350.
Patented Sept. 30, 1913.
7 SHEETS—SHEET 3.
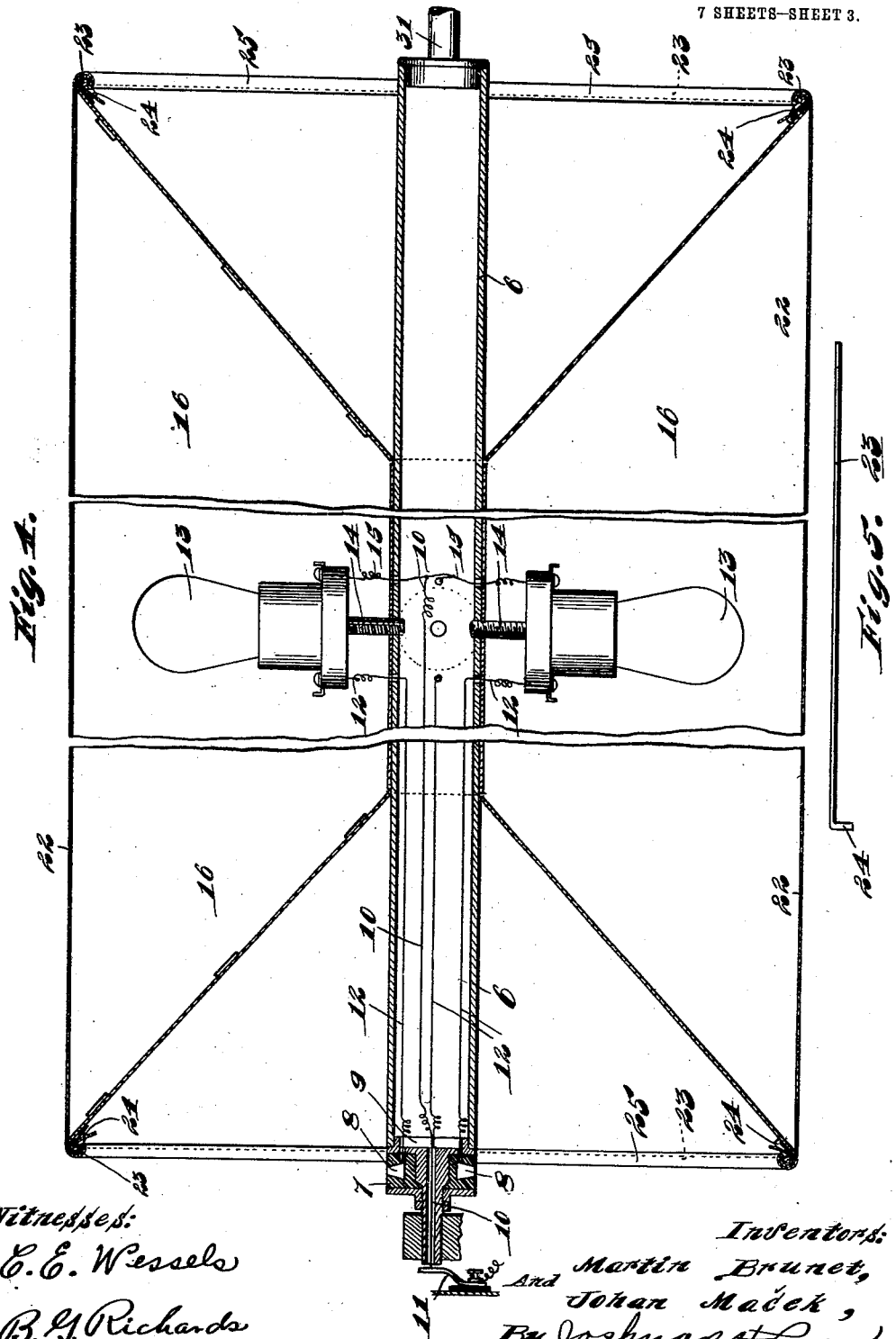
Witnesses:
C. E. Wessels
B. G. Richards
Inventors:
Martin Brunet,
And Johan Maček,
By Joshua R. H. Potts
their Attorney M. BRUNET & J. MAČEK.
SIGN.
APPLICATION FILED JULY 11, 1912.
1,074,350.
Patented Sept. 30, 1913.
7 SHEETS—SHEET 4.
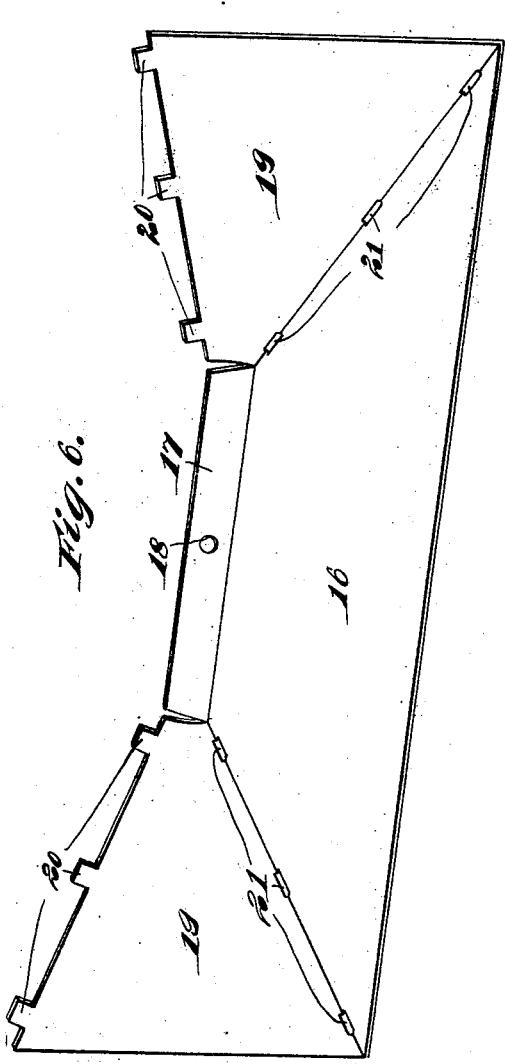
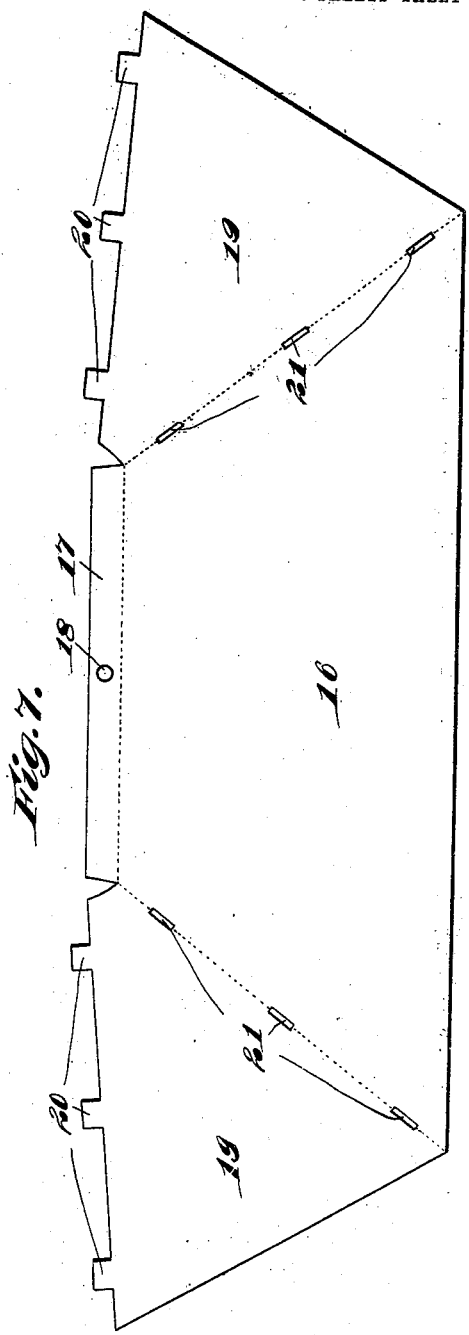

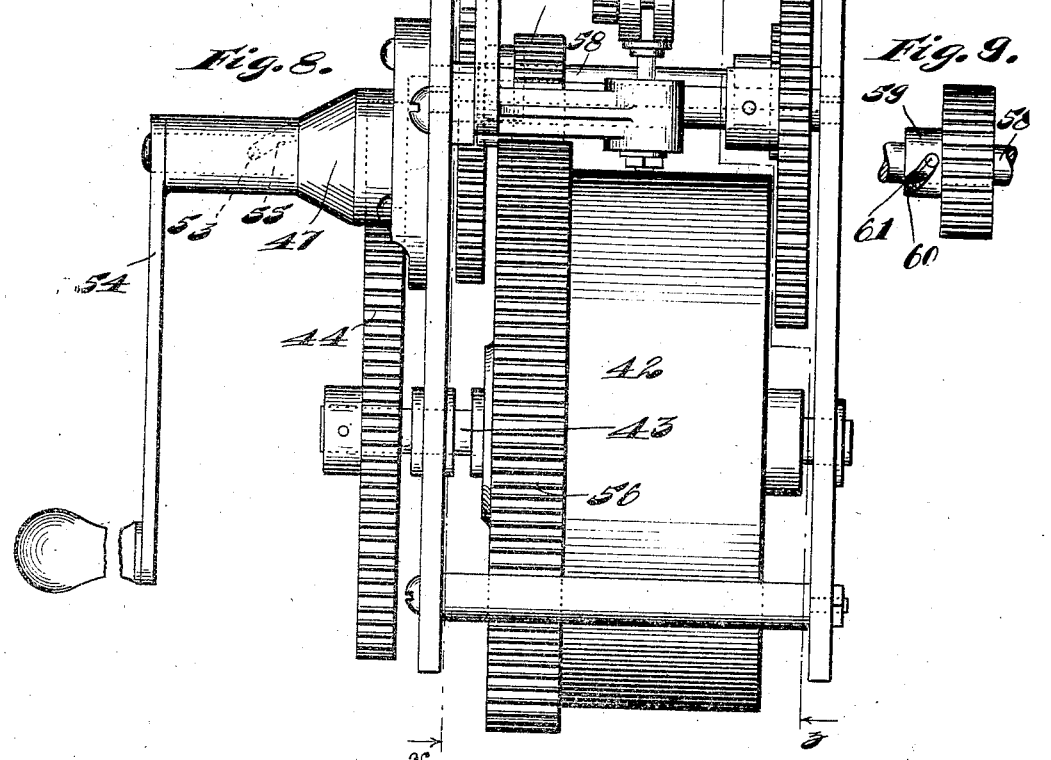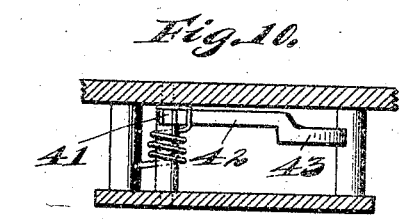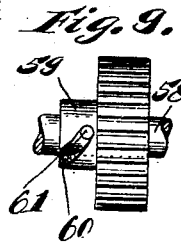

M. BRUNET & J. MACEK.
SIGN.
APPLICATION FILED JULY 11, 1912.

1,074,350.

Patented Sept. 30, 1913.
7 SHEETS—SHEET 6.

Witnesses:
C. E. Wessels
B. G. Richards

Inventors:
Martin Brunet,
And Johan Maček,
By Johnson & Foss
their Attorney.

M. BRUNET & J. MAČEK.
SIGN.
APPLICATION FILED JULY 11, 1912.

1,074,350.

Patented Sept. 30, 1913.
7 SHEETS—SHEET 7.

Witnesses:
C. E. Weasen.
B. Y. Richards

Inventors:
Martin Brunet,
And Johan Maček,
By Joshua R. H. Potts
their Attorney.

UNITED STATES PATENT OFFICE.

MARTIN BRUNET, OF NORTH CHICAGO, AND JOHAN MAČEK, OF WAUKEGAN, ILLINOIS.

SIGN.

1,074,350. Specification of Letters Patent. Patented Sept. 30, 1913.

Application filed July 11, 1912. Serial No. 708,776.

*To all whom it may concern:*

Be it known that we, MARTIN BRUNET and JOHAN MAČEK, citizens of the United States, and residents of the city of North Chicago, county of Cook, and State of Illinois, and of the city of Waukegan, county of Lake, and State of Illinois, respectively, have invented certain new and useful Improvements in Signs, of which the following is a specification.

Our invention relates to improvements in advertising signs and has for its object the provision of a device of this character which will automatically present different signs to view, and which is of simple construction and efficient in operation.

The invention consists in the combinations and arrangements of parts hereinafter described and claimed.

Figure 3:
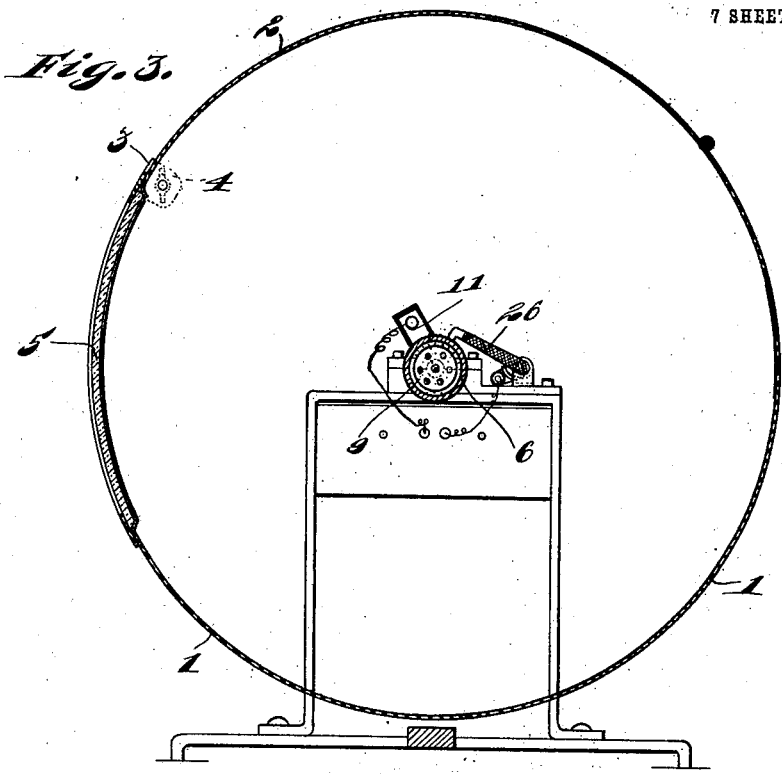
Figure 2:
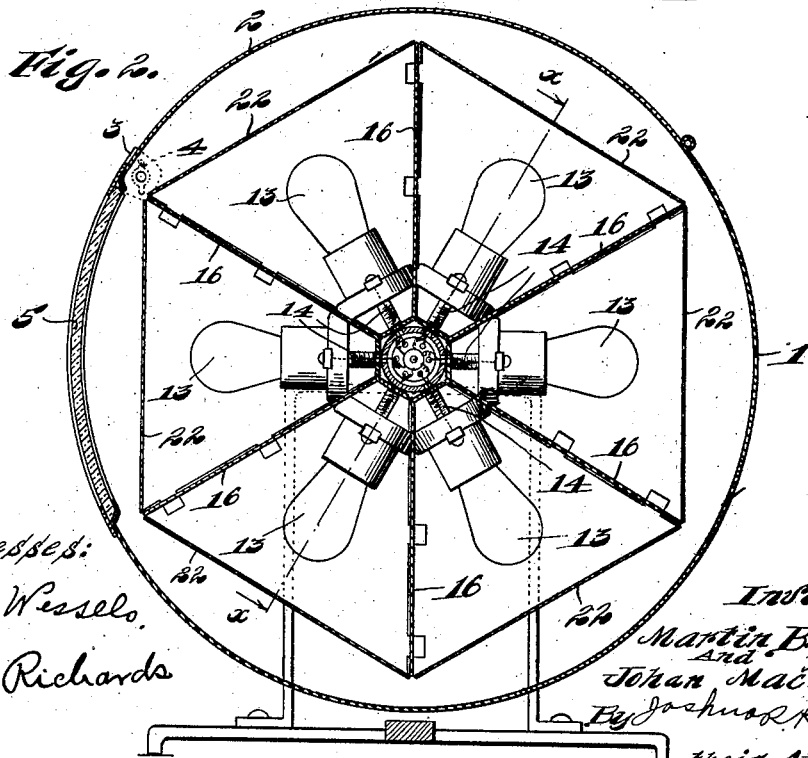
Figure 11:
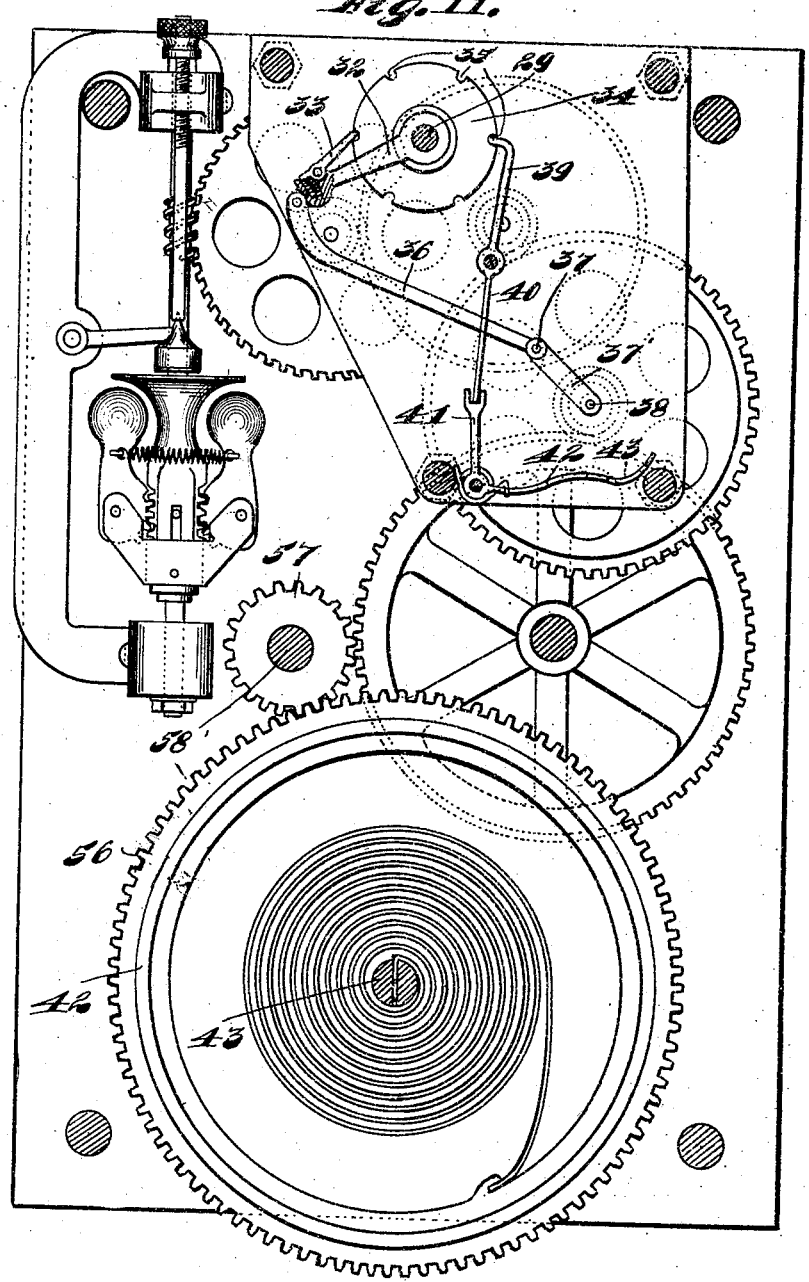
Figure 15:
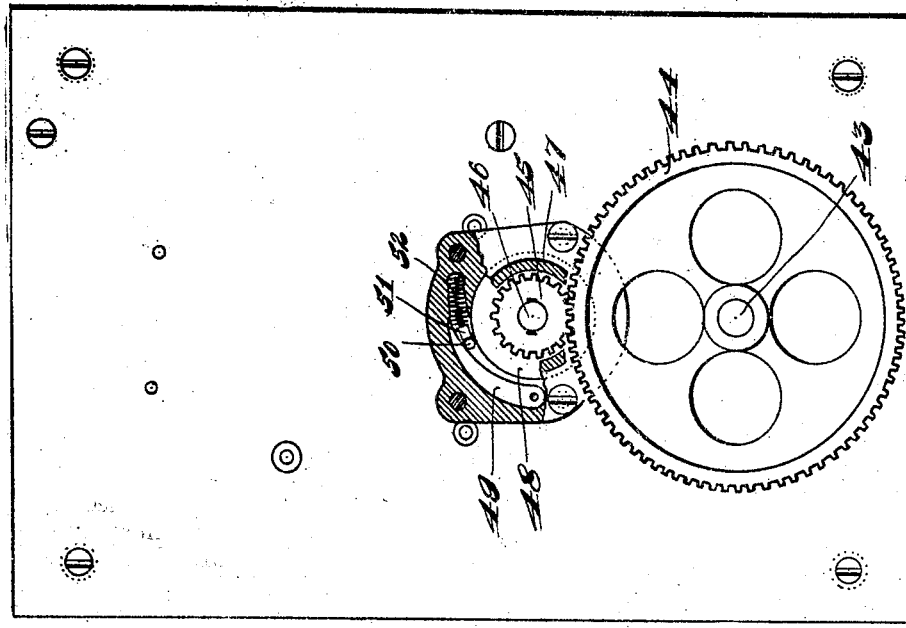
Figure 16:
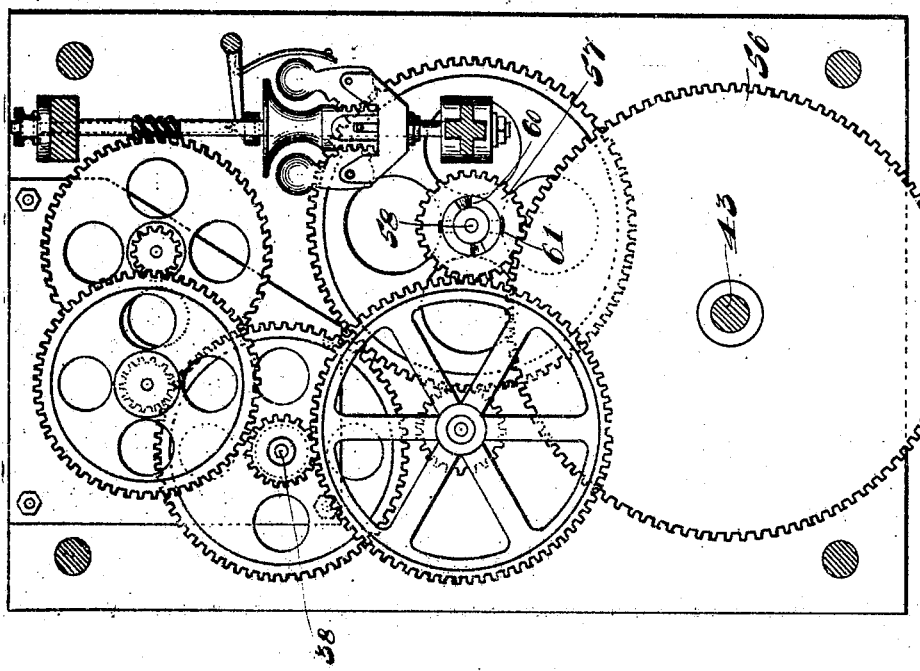

Our invention will be best understood by reference to the accompanying drawings forming a part of this specification and in which, Figure 1 is a side elevation of an advertising sign embodying our invention, Fig. 2 is a cross-section of the sign, Fig. 3 is a cross-section of the sign showing means for furnishing electric current thereto for illuminating the same, Fig. 4 is a longitudinal section of the sign with the outer housing removed, taken on line $x$—$x$ of Fig. 2. Fig. 5 is a view showing a locking rod employed in the sign, Fig. 6 is a perspective view of a partition employed in the sign to form sign compartments therein, Fig. 7 is a plan view showing the blank from which said partition is formed, Fig. 8 is a side elevation of a clock mechanism employed to operate the sign and shown with its inclosing housing removed, Fig. 9 is a detail view of an automatic disengaging clutch employed in the clock mechanism, Fig. 10 is a detail view illustrating a bell crank used in conjunction with the clock mechanism for imparting intermittent motion to the sign proper, said view being taken on line $y$—$y$ of Fig. 8, Fig. 11 is a section taken on line $z$—$z$ of Fig. 8, Fig. 12 is a reduced section taken on line $v$—$v$ of Fig. 8, and Fig. 13 is an elevation of a clock mechanism housing with a portion of said housing broken away to illustrate a clutch mechanism employed in conjunction with the winding shaft of the clock mechanism.

The preferred form of construction as illustrated in the drawings comprises a cylindrical housing 1 made of sheet metal and provided with an upwardly swinging cover 2. Cover 2 is provided at each side with lugs 3 extending over the corresponding sides of housing 1 and locking nuts 4 are provided for securing said lugs, and in consequence said cover, when in closed position. Housing 1 is also provided with an exposure opening which may be covered with a glass plate 5 as shown. A hollow shaft 6 is rotatably mounted in housing 1 and is provided at one end with a hub 7 of insulating material and having wedged shaped electric contact members 8 embedded therein and exposed on the surface thereof. Hub 7 is mounted on a spindle 9 which is secured in the end of shaft 8 and is provided with a central perforation arranged co-axially therewith and adapted to accommodate an electric wire or conductor 10, as shown in Fig. 4. Conductor 10 extends from the end of spindle 9 co-axially therewith and contacts with a spring electric contact member 11 secured to the corresponding end of housing 1. An electric conductor or wire 12 is connected with each of the contact members 8 and extends inwardly into hollow shaft 6, suitable openings being provided in spindle 9 and hub 7 for this purpose, said conductors 12 being suitably insulated. A plurality of electric light bulbs 13 are secured centrally to shaft 6 and project radially therefrom, each of said bulbs being mounted on a stud 14 which is threaded in said shaft. One terminal of each of the bulbs 13 is connected by a wire 15 with wire 10 and the other terminal of each of said bulbs is connected with the corresponding wire 12, there being the same number of wires 12 and contact members 8 as there are electric light bulbs. A plurality of radiating partitions 16 are mounted on shaft 6 to provide a plurality of radiating sign compartments inclosing electric light bulbs 13, there being a compartment for each of said bulbs. Each of said partitions 16 is provided at its inner edge with a lip or flange 17 which is adapted to rest upon shaft 6 and is provided with a central perforation 18 for the passage of the corresponding stud 14. At each end each partition 16 is provided with an end flange 19 which is bent with relation to said partition and adapted to constitute the corresponding end of the sign compartment. Each of the end flanges 19 is provided on its free edge with tangs 20 and slots 21 are provided at the line of bending between said end flange and said partition, in position to receive the corresponding tangs 20 on an adjacent partition. In assembling the construction the tangs 20 on the end flange of each partition are passed through the corresponding slots 21 in the adjacent partition and bent over the inside thereof to secure all of said partitions together to form a plurality of radiating pyramidal sign compartments as indicated.

The outer side of each of the sign compartments is covered by a transparent sign sheet 22 which is provided with any suitable or desired advertising announcement, said sign sheets being attachably secured in positions by means of locking rods 23 having finger pieces 24 at one end and inserted in beads 25 formed at the ends of the corresponding sign compartments, the ends of said sign sheets being secured by arranging said ends over the openings in said beads and pressing said ends into said beads by means of rods 23, as indicated in Fig. 4. A spring held electric contact brush 26 is mounted on the corresponding end of housing 1 and contacts with the periphery of hub 7 and contact members 8, and an electrical socket member 27 is secured to the corresponding end of housing 1 and connecting with brush 26 and contact member 11 as indicated. By this arrangement it will be observed that one terminal of each of the electric bulbs 13 is always in electrical connection with electrical contact 11 and consequently with one of the electric supply wires, so that when one of the contact members 8 makes contact with brush 26 the corresponding light will be supplied with electric current and excited to illuminate the corresponding sign compartment. Said contact member 8 and brush 26 are arranged to contact with each other when the corresponding sign compartment is opposite the exposure opening in housing 1.

The shaft 6, and consequently the plurality of sign compartments, is rotated intermittently by means of suitable clock mechanism in a suitable housing 28 arranged at the end of housing 1 opposite the electric socket member 27. To this end, a driven shaft 29 is provided in said clock mechanism to be rotated intermittently thereby, said shaft 29 carrying a coupling member 30 which is adapted to be attached to the end of a spindle 31 carried by the corresponding end of shaft 6. A pawl arm 32 is loosely mounted on shaft 29 and carries a spring held pawl 33 arranged to ride upon the periphery of a wheel 34 which is secured to shaft 29 and provided with notches 35 in its periphery. Pawl arm 32 is connected by a link 36 with a crank pin 37 which is carried by a crank arm 37' secured to the end of a shaft 38, said shaft 38 being suitably connected with the clock mechanism above mentioned so as to be rotated constantly thereby. A check pawl 39 is arranged to ride upon the periphery of wheel 34 and engage notches 35 to prevent movement of shaft 29, said notches 35 and pawl 39 being arranged to hold shaft 6 in position to cause the different illuminating sign compartments to register with the exposure opening in housing 1. The pawl 39 is provided with an extension 40 engaging a bifurcation in the end of one arm 41 of a spring held bell crank and the other end 42 of said bell crank lever is provided with a lateral extension or cam surface 43 which is set in the path of crank pin 37, the arrangement being such that said crank pin contacts with cam portion 43 to remove pawl 39 from engagement with wheel 34 at the beginning of the operative movement of pawl arm 32 and release said pawl arm for engagement with wheel 34 as will be understood readily. By this arrangement it will be observed that as shaft 28 rotates, the pawl arm 32 will be caused to oscillate and pawl 33 to engage the notches 35 in wheel 34 to produce intermittent rotations of shaft 6 and consequently of the plurality of sign compartments. Said sign compartments will be brought into registration with the exposure opening in housing 1 successively and then permitted to remain in registration with said exposure opening for an appreciable period to exhibit the corresponding sign sheet, the electric light bulb in said sign compartment being excited during such exhibition.

The clock mechanism referred to above comprises a suitable spring drum 42 having the usual spring shaft 43 therein. Shaft 43 carries a gear 44 meshing with a gear 45 which is secured to a winding shaft 46 arranged in a housing 47 as shown. Shaft 46 also carries a cylindrical wheel 48 and housing 47 is provided with a cam member 49 arranged opposite the periphery of wheel 48 and gradually approaching said periphery as shown in Fig. 13. A binding roller 50 is arranged between cam 49 and wheel 48 and is pressed normally toward the narrow space therebetween, by means of a block 51 and a spring 52. Shaft 46 carries a pin 53 and a winding crank 54 is provided for shaft 46, said winding crank 54 being provided with inclined notch 55 adapted to engage pin 53 as will be understood readily. By this arrangement it will be observed that crank 54 may be engaged with shaft 46 and said shaft operated to wind the spring in drum 43; and upon release of said shaft 46, binding roller 50 will automatically bind between cam 49 and wheel 48 to prevent retrograde movement of winding shaft 46. Drum 42 carries a driving gear 56 meshing with a pinion 57 on a shaft 58, constituting a part of the clock mechanism. Pinion 57 is provided with a hub 59 having an inclined notch 60 therein adapted to engage a pin 61 on shaft 58. By this arrangement it will be observed that during operative rotation of drum 42 gear 56 and pinion 57 will be locked to shaft 58 by means of notch 60 and pin 61, but that in case of breakage of the spring in drum 42 and consequent tendency to reverse the motion of shaft 58, the gear 57 will be disengaged automatically from said shaft 58 by the action of notch 60 and pin 61, thus preventing injury to the clock mechanism in case of such an accident.

The construction described is capable of presenting a variety of advertising announcements to the public in a form and manner to attract attention and will be found to be of durable construction and efficient in use.

While we have illustrated and described the preferred construction for carrying our invention into effect, the same is capable of variation or modification without departing from the spirit of the invention. We therefore do not wish to be limited to the exact details of construction set forth, but desire to avail ourselves of such variations and modifications as come within the scope of the appended claims.

Having described our invention what we claim as new and desire to secure by Letters Patent is:

1. A sign comprising a hollow shaft; a plurality of radiating partitions secured to said shaft and forming a plurality of radiating compartments, each of said partitions being provided at its inner edge with a lip secured to said shaft and each end with an end flap bent to constitute the corresponding end of the corresponding compartment, the free ends of said end flaps being provided with securing tangs, and there being slots at the bends to receive said tangs; means of illumination in said compartments; transparent sign sheets arranged over the sides of said compartments; and means for rotating said shaft intermittently to expose the different sign sheets, substantially as described.

2. A sign comprising a hollow shaft; a plurality of radiating partitions secured to said shaft and forming a plurality of radiating compartments, each of said partitions being provided at its inner edge with a lip secured to said shaft and each end with an end flap to constitute the corresponding end of the corresponding compartment, the free ends of said end flaps being provided with securing tangs, and there being slots at the bends to receive said tangs, substantially as described.

3. A sign comprising a hollow shaft; a plurality of radiating partitions secured to said shaft and forming a plurality of radiating compartments, each of said partitions being provided at its inner edge with a lip secured to said shaft and at each end with an end flap bent to constitute the corresponding end of the corresponding compartment, the free end of said flap being provided with securing tangs and there being slots at the bends to receive said tangs, the ends of each compartment being divergingly inclined away from each other, substantially as described.

4. A sign comprising a hollow shaft; a plurality of compartments formed about said shaft; an electric light bulb in each of said compartments; a hub of insulating material formed at one end of said shaft; electrical contact members embedded in said hub; a wire connecting each of said contact members with one terminal of a different one of said bulbs; an electric brush rubbing upon said hub and said contact member; an electric contact member projecting co-axially from said hub and connected with the other terminals of all of said bulbs; an electric contact member rubbing against the end of said co-axially projecting contact member; a transparent sign sheet arranged over the outer sides of each of said compartments; and means for rotating said shaft intermittently to expose the different sign sheets, substantially as described.

In testimony whereof we have signed our names to this specification in the presence of two subscribing witnesses.

MARTIN BRUNET.
JOHAN MAČEK.

Witnesses:
JOSHUA R. H. POTTS,
B. G. RICHARDS.